US008549303B2

(12) United States Patent
Fifield et al.

(10) Patent No.: US 8,549,303 B2
(45) Date of Patent: *Oct. 1, 2013

(54) APPARATUS, SYSTEM AND METHOD FOR ELECTRONICALLY SIGNING ELECTRONIC TRANSCRIPTS

(75) Inventors: Davin Fifield, Redmond, WA (US); Kevin Koch, Grand Junction, CO (US)

(73) Assignee: West Services, Inc., Eagan, MN (US)

(*) Notice: Subject to any disclaimer, the term of this patent is extended or adjusted under 35 U.S.C. 154(b) by 572 days.

This patent is subject to a terminal disclaimer.

(21) Appl. No.: 12/631,457

(22) Filed: Dec. 4, 2009

(65) Prior Publication Data

US 2010/0122153 A1 May 13, 2010

Related U.S. Application Data

(63) Continuation of application No. 10/711,551, filed on Sep. 24, 2004, now abandoned, and a continuation-in-part of application No. 09/875,446, filed on Jun. 5, 2001, now Pat. No. 7,689,900.

(60) Provisional application No. 60/209,809, filed on Jun. 5, 2000.

(51) Int. Cl.
*G06F 17/00* (2006.01)
*H04L 9/00* (2006.01)

(52) U.S. Cl.
USPC ........... 713/176; 715/230; 715/255; 715/256; 715/268; 707/503; 707/698; 707/747

(58) Field of Classification Search
USPC ................ 713/176, 158, 165, 166, 167, 171; 715/230, 255, 256, 268
See application file for complete search history.

(56) References Cited

U.S. PATENT DOCUMENTS

| | | | |
|---|---|---|---|
| 6,091,835 A | 7/2000 | Smithies et al. | |
| 6,336,188 B2 | 1/2002 | Blake-Wilson et al. | |
| 6,757,826 B1 * | 6/2004 | Paltenghe | 713/170 |
| 6,772,342 B1 * | 8/2004 | Hawthorne | 713/176 |
| 6,865,678 B2 * | 3/2005 | Fischer | 713/176 |
| 6,901,509 B1 | 5/2005 | Kocher | |
| 6,950,943 B1 * | 9/2005 | Bacha et al. | 726/21 |
| 7,007,166 B1 * | 2/2006 | Moskowitz et al. | 713/176 |

(Continued)

OTHER PUBLICATIONS

Frequently Asked Questions about Today's Cryptography Version 4.1 by RSA Labs (May 2000).*

*Primary Examiner* — William Bashore
*Assistant Examiner* — Nathan Shrewsbury
(74) *Attorney, Agent, or Firm* — Pillsbury Winthrop Shaw Pittman LLP

(57) ABSTRACT

A method for electronically signing an electronic transcript. The method includes obtaining an image of a court reporter's signature which may be incorporated into an electronic transcript. A hash operation performed on the electronic transcript to generate a representation of the contents of the electronic transcript. The representation of the contents of the electronic transcript is recorded/time stamped by a digital notary service, from which a notary record of the time stamping is obtained from the digital notary service. The notary record is digitally signed, and an electronically signed electronic transcript is formed by bundling the digitally signed notary record with the electronic transcript and with the data identifying the user. In this manner, an electronic transcript with an electronic signature is created. The electronic transcript may be viewed, with the image displayed in the viewer having an image of the court reporter's signature.

14 Claims, 16 Drawing Sheets

(56) References Cited

U.S. PATENT DOCUMENTS

| | | |
|---|---|---|
| 7,100,199 B2 | 8/2006 | Ginter et al. |
| 7,120,802 B2 | 10/2006 | Shear et al. |
| 7,143,290 B1 | 11/2006 | Ginter et al. |
| 7,237,114 B1 * | 6/2007 | Rosenberg .................... 713/176 |
| 7,281,133 B2 * | 10/2007 | Ginter et al. ................... 713/176 |
| 7,392,395 B2 * | 6/2008 | Ginter et al. ................... 713/176 |
| 7,689,900 B1 * | 3/2010 | Fifield et al. ................... 715/230 |
| 7,779,261 B2 * | 8/2010 | Moskowitz et al. .......... 713/176 |
| 7,904,722 B2 * | 3/2011 | Sudia et al. ................... 713/176 |
| 2002/0041713 A1 * | 4/2002 | Imagawa et al. .............. 382/229 |
| 2002/0116633 A1 * | 8/2002 | Kobayashi et al. ........... 713/200 |
| 2002/0161721 A1 * | 10/2002 | Yuan et al. ...................... 705/65 |
| 2003/0163704 A1 | 8/2003 | Dick et al. |
| 2004/0003261 A1 * | 1/2004 | Hayashi ........................ 713/187 |
| 2004/0049678 A1 | 3/2004 | Walsmley et al. |
| 2004/0111530 A1 | 6/2004 | Sidman |
| 2004/0133784 A1 | 7/2004 | Tonnesland et al. |
| 2006/0161780 A1 * | 7/2006 | Berryman et al. ............. 713/176 |

* cited by examiner

FIG. 12

APPARATUS, SYSTEM AND METHOD FOR ELECTRONICALLY SIGNING ELECTRONIC TRANSCRIPTS

CROSS-REFERENCE TO RELATED APPLICATIONS

This application is a continuation-in-part of U.S. patent application Ser. No. 09/875,446 filed Jun. 5, 2001 entitled "Apparatus, System, and Method for Electronically Signing Electronic Transcripts," which claims the benefit of U.S. Provisional Application Ser. No. 60/209,809 entitled "Apparatus, System, and Method for Electronically Signing Electronic Transcripts," filed Jun. 5, 2000. The disclosure of each of these related applications is incorporated by reference herein in its entirety.

FIELD OF THE INVENTION

This invention relates, in general, to the electronic signing of documents, and in particular, to the electronic signing of electronic transcripts.

BACKGROUND OF THE INVENTION

Conventionally, court reporters use a computerized stenography machine to transcribe court proceedings or depositions and generate text files. For example, using computer aided transcription ("CAT") software, the court reporter can generate an ASCII text file. The court reporter, or the reporter's respective agency, would manipulate the ASCII file to produce a final transcript, conventionally using a word processor to edit the ASCII transcript file. The court reporter can then send the ASCII transcript file as an e-mail attachment to an attorney, client, etc. While the present invention and background is generally described with reference to ASCII transcript files, the court reporter may generate the text of the transcript in other forms such as, for example, real time streaming data.

Conventional transmission of a transcript file has limitations. For example, it is possible to alter the contents of the ASCII transcript file after the court reporter has sent the file over a network, such as the Internet, unbeknownst to the sender or recipient. Hence the integrity of the contents of the transcript may be jeopardized. Also, the conventional ASCII transcript file lacks a court reporter's signature. Accordingly, if a receiving party of the ASCII transcript file wants to obtain a certified copy of the transcript, the recipient must request a physical (i.e., "paper"), certified copy of the transcript having the court reporter's physical signature present therein.

Accordingly, as recognized by the present inventors, what is needed is a method for electronically signing and certifying an electronic document, such as an electronic transcript, by a signing entity, such as a court reporter, wherein the integrity of the electronic document is maintained and the electronic signature/certification is both authentic and valid. Further, what is needed is a system to view the electronic document by the recipient, as well as a method for the recipient to verify the authenticity and integrity of the electronic document.

It is against this background that various embodiments of the present invention were developed.

SUMMARY OF THE INVENTION

According to one aspect of the invention, a method for electronically signing an electronic transcript is provided. The method includes obtaining an electronic transcript, such as a data file from a court reporter containing text of a transcript along with page and line number information. Signature location information is obtained, including at least one of a page number and a line number within the transcript where a signature image of the court reporter signing the transcript is to appear. A signature image is incorporated into the electronic transcript, and associated with the signature location information. A modification detection operation, such as a hash operation, is performed on the electronic transcript to generate a representation of the contents of the electronic transcript. The recording and time stamping by a digital notary service of the representation of the contents of the electronic transcript is provided for, and a notary record obtained from the digital notary service of the time stamping. The notary record is digitally signed and an electronically signed electronic transcript is formed by bundling the digitally signed notary record with the electronic transcript. In one embodiment, the signature image is obtained by scanning a document containing the court reporter's signature into an image file. In this manner, an electronic transcript with an electronic signature is created that, when viewed, contains an image of a court reporter's signature.

The foregoing and other features, utilities and advantages of the invention will be apparent from the following more particular description of a preferred embodiment of the invention as illustrated in the accompanying drawings and claims.

BRIEF DESCRIPTION OF THE DRAWINGS

FIG. 12 illustrates a sample display screen showing an electronic transcript with an icon indicating that the transcript has been electronically signed, in accordance with one embodiment of the present invention.

DETAILED DESCRIPTION

Disclosed herein is a system and method for electronically signing an electronic document, and for later verifying the validity and authenticity of the electronically signed document by a recipient thereof (note that the terms electronic document and electronic transcript are used interchangeably, but an electronic transcript is only one type of electronic document). In accordance with various embodiments of the present invention, an electronic transcript, which can be electronically signed and certified by a signing entity such as a court reporter or a delegate thereof, is created from transcript text. The electronic transcript preferably includes the transcript data, an executable transcript viewer, metadata relating to the electronic transcript file, and the electronic signature/certification of the court reporter. Note, while not preferable, the executable transcript viewer can be excluded.

As used herein, the term "electronic signature" includes a digital indication that is imbedded within the electronic document/transcript and preferably is viewable within the electronic document. The electronic signature indicates that the court reporter has certified the particular electronic document, and further that the certification is authentic and that the contents of the electronic document have not changed after the court reporter electronically signed the electronic document, and the signature is preferably valid only for a named recipient.

An electronic document manager module is provided to operate at the computing station of a signing entity such as a court reporter, in one example, and permits the court reporter to create an electronically signed electronic transcript from conventional transcript text. Further, in accordance with one embodiment of the present invention, an electronic transcript viewer module is provided for operation by a recipient of the electronic transcript.

The viewer module permits the recipient to view the electronic transcript, and, in one example, perform a variety of functions such as verifying the integrity and/or the signature of the electronic transcript, searching the text of the electronic transcript, printing the text from the electronic transcript, exporting the text from the electronic transcript into third party word processing software or litigation support software, etc. In one example, the viewer module provides a hyperlinked global word index which permits the user to navigate quickly through the electronic transcript; a user selectable printing option to print the electronic transcript as a normal or condensed transcript (a condensed transcript is where multiple pages of a transcript are reduced and printed on a single page); and an electronic certificate viewable on screen or printable for reviewing the court reporter's electronic signature/certification.

Figure 12:
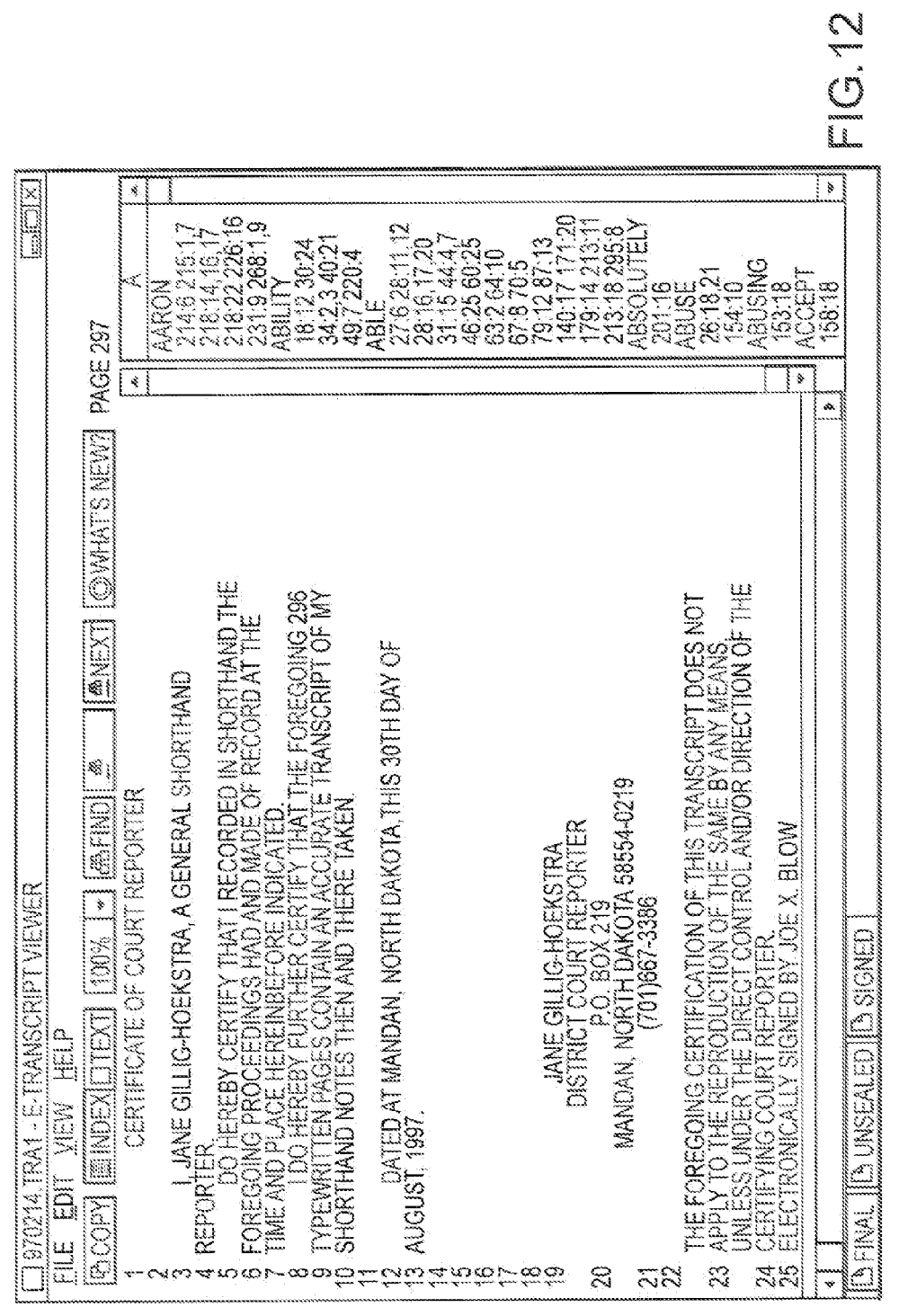
Figure 13:
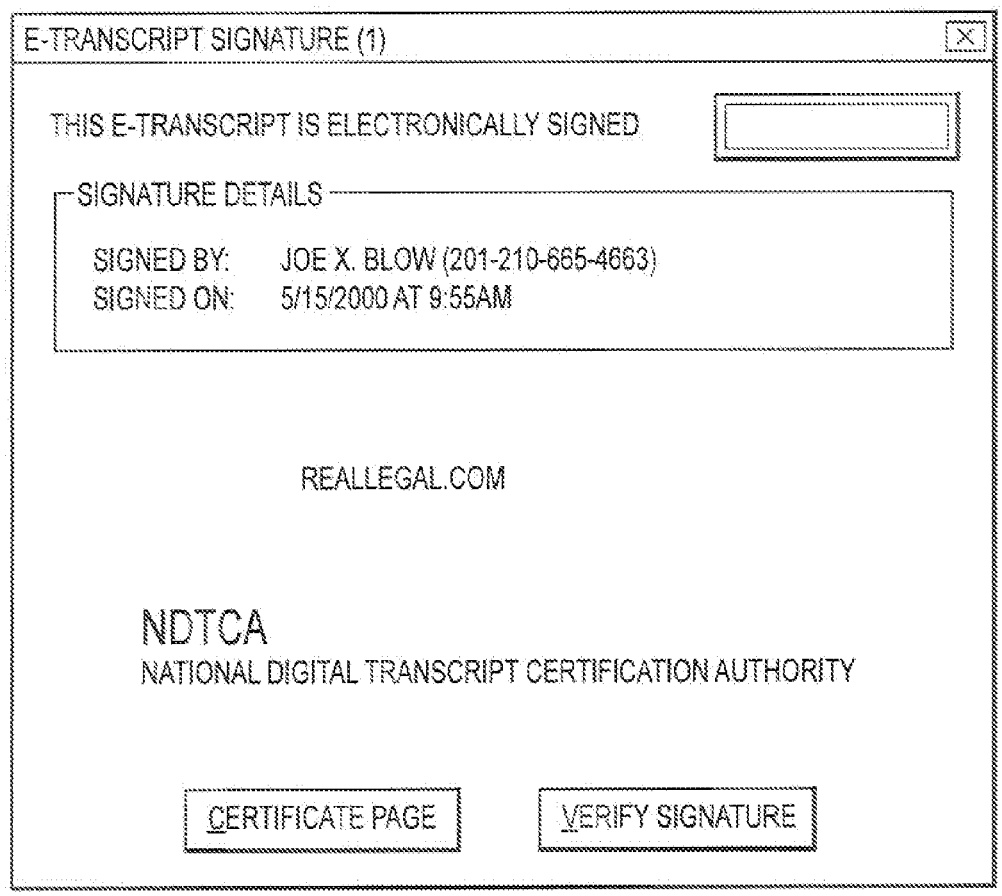
FIG. 13 illustrates a sample display screen showing a display box with electronic signature details displayed therein, in accordance with one embodiment of the present invention.
Figure 14:
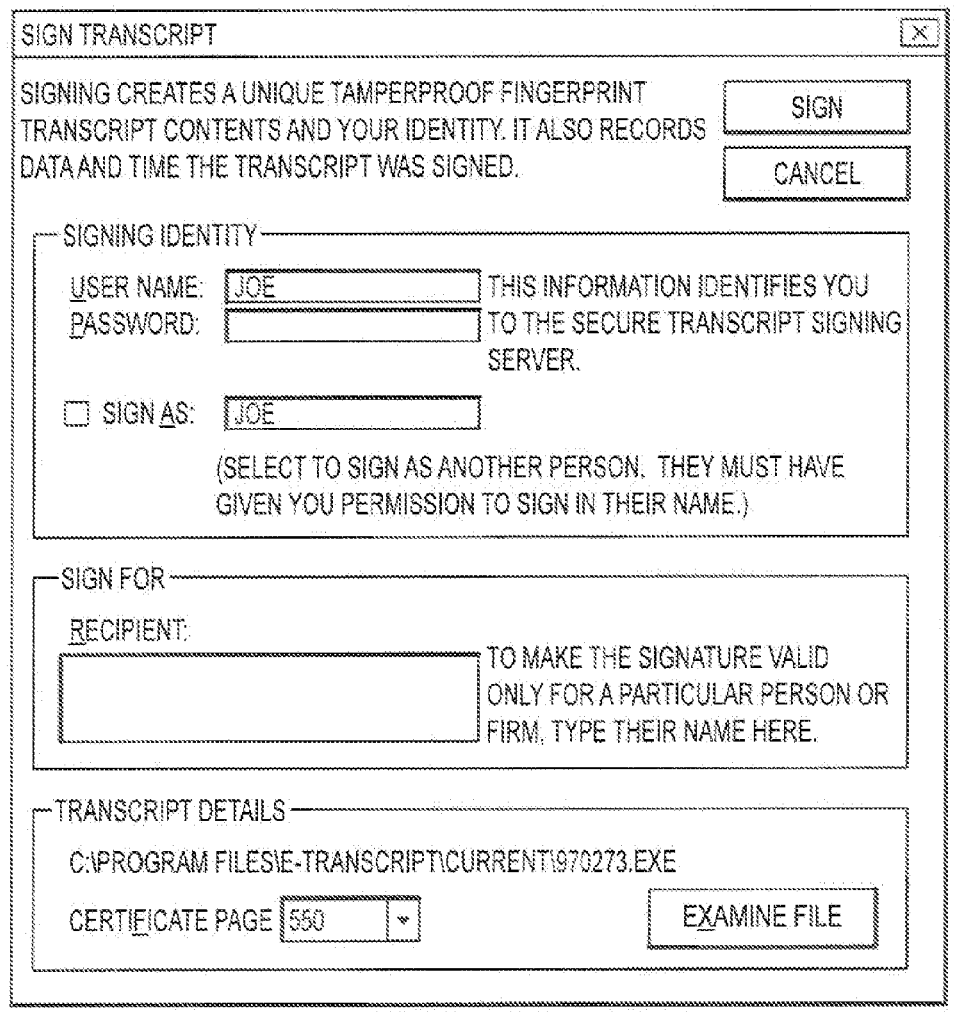
FIG. 14 illustrates a sample display screen showing a dialog box querying from the signer various pieces of data associated with the signing process, in accordance with one embodiment of the present invention.
Figure 15:
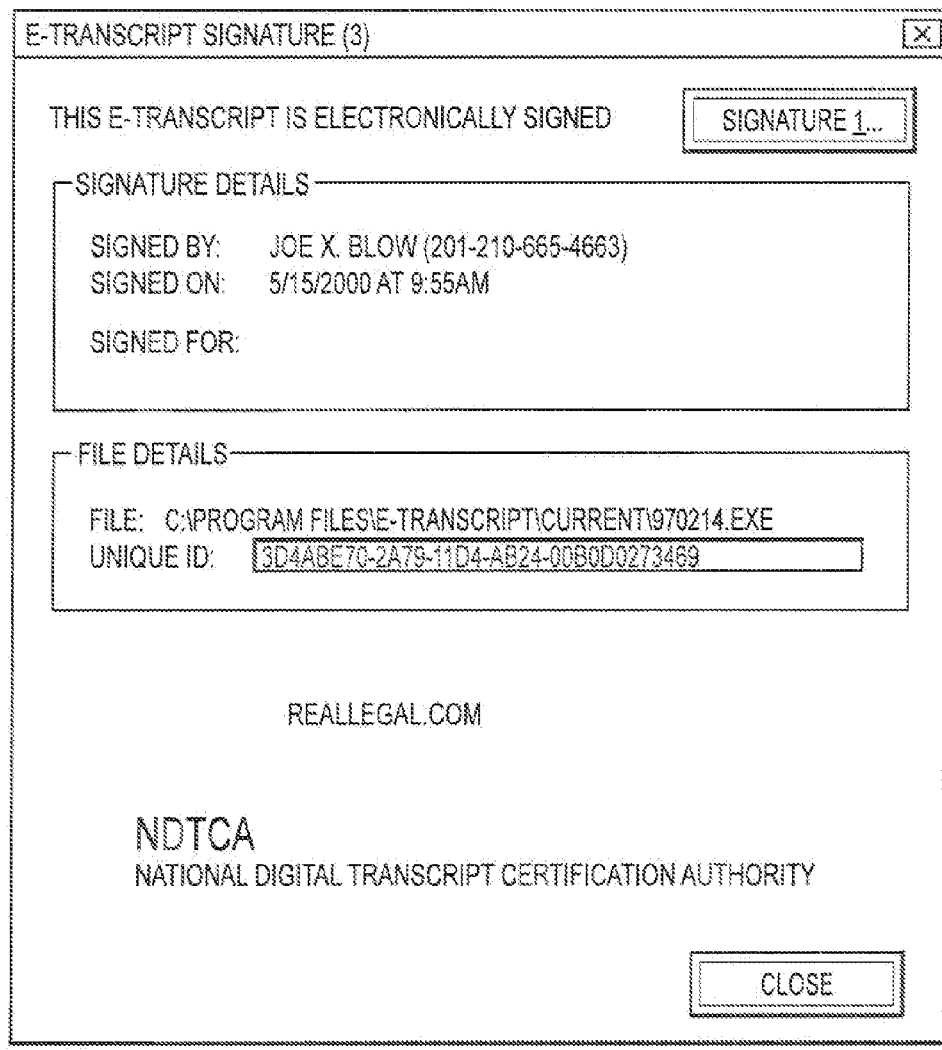
FIG. 15 illustrates a sample display screen showing the details of the electronically signed transcript, in accordance with one embodiment of the present invention.

Several examples sample display screens showing an electronic transcript are illustrated in FIGS. 12 through 15. FIG. 12 is an example of a sample display screen with an icon indicating that the transcript has been electronically signed, in accordance with one embodiment of the present invention. In another embodiment (not shown) an image of the court reporters signature also appears on the display, giving the transcript a similar appearance as a paper transcript that would have been physically signed by a court reporter. FIG. 13 illustrates a sample display screen showing a display box with electronic signature details displayed therein, in accordance with one embodiment of the present invention. As illustrated in FIG. 13, a user has an option to verity a certificate page and/or to verify the signature by selecting the appropriate boxes within the display. FIG. 14 illustrates a sample display screen showing a dialog box querying from the signer various pieces of data associated with the signing process. FIG. 15 illustrates a sample display screen showing the details of the electronically signed transcript, in accordance with one embodiment of the present invention.

Overall, embodiments of the present invention therefore provide faster delivery of certified transcripts because the present invention allows the court reported to electronically sign/certify and transmit the electronic transcripts over great distances without the need for printing, binding, or shipping a paper copy of the transcript. Also, as a consequence of the electronic signing process of the present invention, an electronic trail that cannot be tampered with out detection is provided, as described below. The signed electronic transcript is suitable for viewing by an attorney, a court, a witness, a client or the like.

Figure 1:
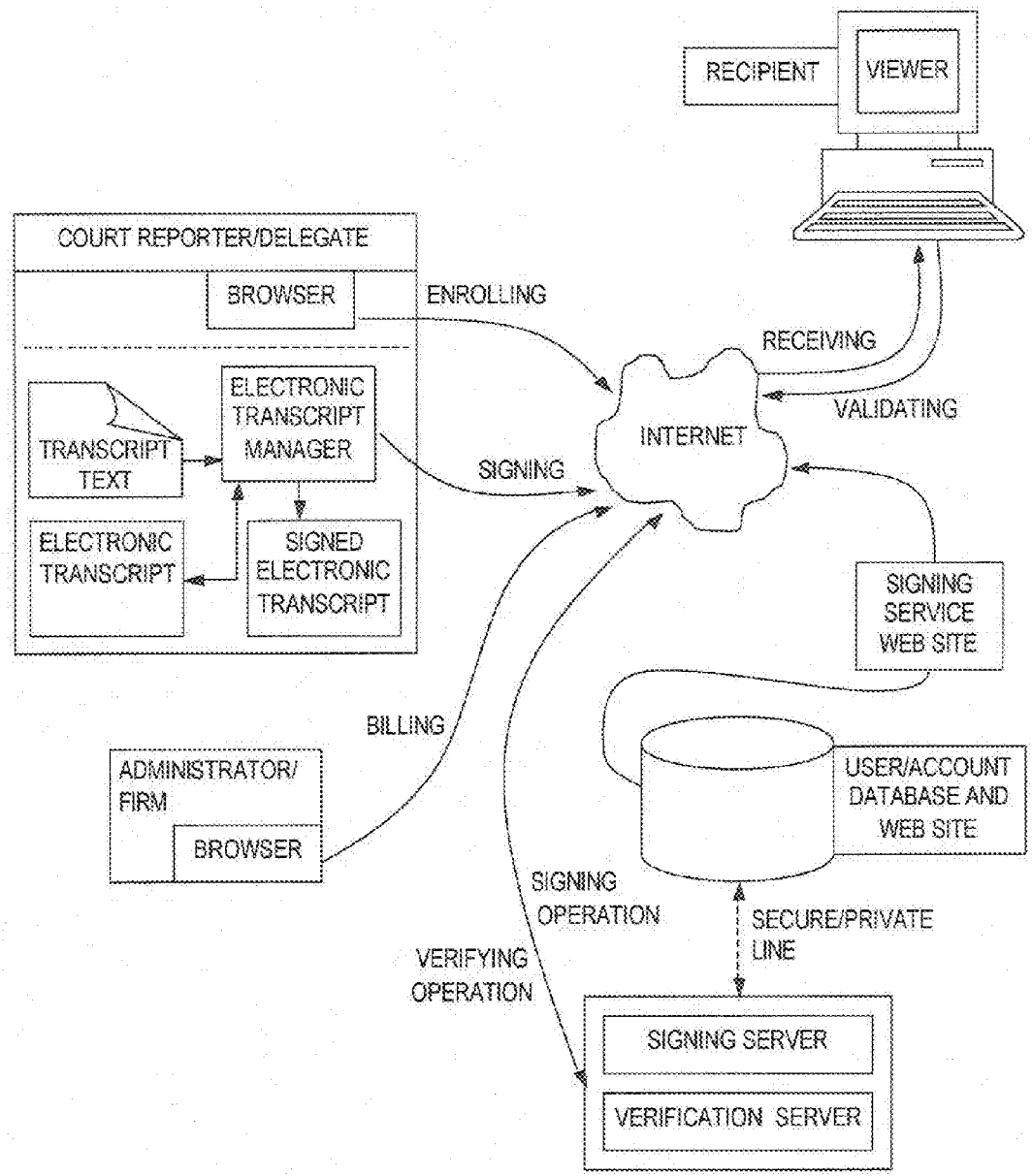
FIG. 1 illustrates a block diagram of one embodiment of the present invention.

Referring to FIG. 1, a system for creating an electronic transcript, electronically signing the electronic transcript, and transmitting the electronic transcript from a signing entity such as a court reporter or delegate to a designated recipient is shown. In accordance with the present invention, the electronic transcript manager module is adapted to operate on the court reporter's local computing system. As will be explained below, the electronic transcript manager module converts the transcript text file (e.g., an ASCII transcript text file) into an electronic transcript that, in accordance with the present invention, is a read-only, encrypted, virus- and password-protected file. Further, the manager module also creates, at the command of the court reporter, an electronically signed and certified electronic transcript.

As shown in FIG. 1, the court reporter's computing station, the recipient's computing station, an administrator's/firm's computing station, a signing service website and signing/verification servers are coupled to a network, such as the Internet, which permits communications and data transmissions there between. While it is preferred to have logically separate components as shown in FIG. 1, one of ordinary skill in the art will now recognize that these components could be further separated or combined. For example, the function of the signing and verification servers may be handled by one or more servers. Similarly, the signing service web site and user/account database may be physically separate as shown or conjoined. Moreover, the signing and verification servers could be conjoined with the signing service web site and user/account database, or any combination thereof. Preferably, a secure/private line connects the user/account database to the signing and verification servers to allow the signing server to authenticate singers against the user/account database securely.

The recipient's computing station receives a signed electronic transcript, and because in a currently preferred embodiment the electronic transcript file contains an executable viewer therein, the recipient can readily view and examine the signed electronic transcript. Further, as will be discussed below, the recipient can activate a verification function to perform a number of steps to verify the integrity of the signed electronic transcript. In this manner, the recipient can quickly verify at the recipient's computer the authenticity and reliability of the received electronically signed electronic transcript.

Through the signing service web site, which a court reporter (or delegate) can access through a conventional browser, the court reporter can sign up and create an account in the user/account database, as well as perform the signing operation to electronically sign an electronic transcript. Further, once the court reporter has completed the edits to the final version of the transcript text and is ready to electronically sign/certify it, and upon creating the electronic transcript, the court reporter/delegate can send the signed/certified electronic transcript to the recipient over a network. In this manner, the recipient receives, in a matter of moments, an electronically signed/certified electronic transcript that is readily viewable at the recipient's local computing station.

A firm administrator can also access the signing service web site through a conventional browser running on the local computing station of the administrator. In doing so, the administrator can manage the firm's billing account, associating the billing information with signing entities, such as freelance court reporters, having a relationship to the administrator's firm. In other words, the administrator attaches signing entities to the firm's billing account so that when that signing entity signs an electronic document, the signature is billed to the administrator's firm. While it is presently preferred to have signing entities associated with only one firm, it is possible to have signing entities associated with multiple firms. When a signing entity is associated with multiple firms, the administrator and signing entity identify the signing entity by a user ID unique to that firm. Thus, a signing entity associated with multiple firms may have multiple user IDs. In an alternate embodiment of the present invention, a single user ID may be associated with multiple billing accounts. In this case, the billing account may be chosen at the time the electronic signature is created.

As shown in FIG. 1, a signing server is coupled to the network and interacts with, at least, the user/account database and the recipient's computing station. The signing server plays a part in the signing function, in response to a signing entity's, such as a court reporter's, request to electronically sign an electronic transcript (Note that the terms signing entity and court reporter are used interchangeably, but a court report is just one example of a signing entity). Furthermore, the verification server plays a role in the verification function when a recipient of a particular electronically signed electronic transcript requests verification/validation of the integrity of the electronically signed electronic transcript. Note that the signing and verification servers, while shown as logically separate components, could host the user/account database and signing service web site, as discussed above. Alternatively, an independent Internet service provider could host the user/account database and signing service web site, separately.

Figure 2:
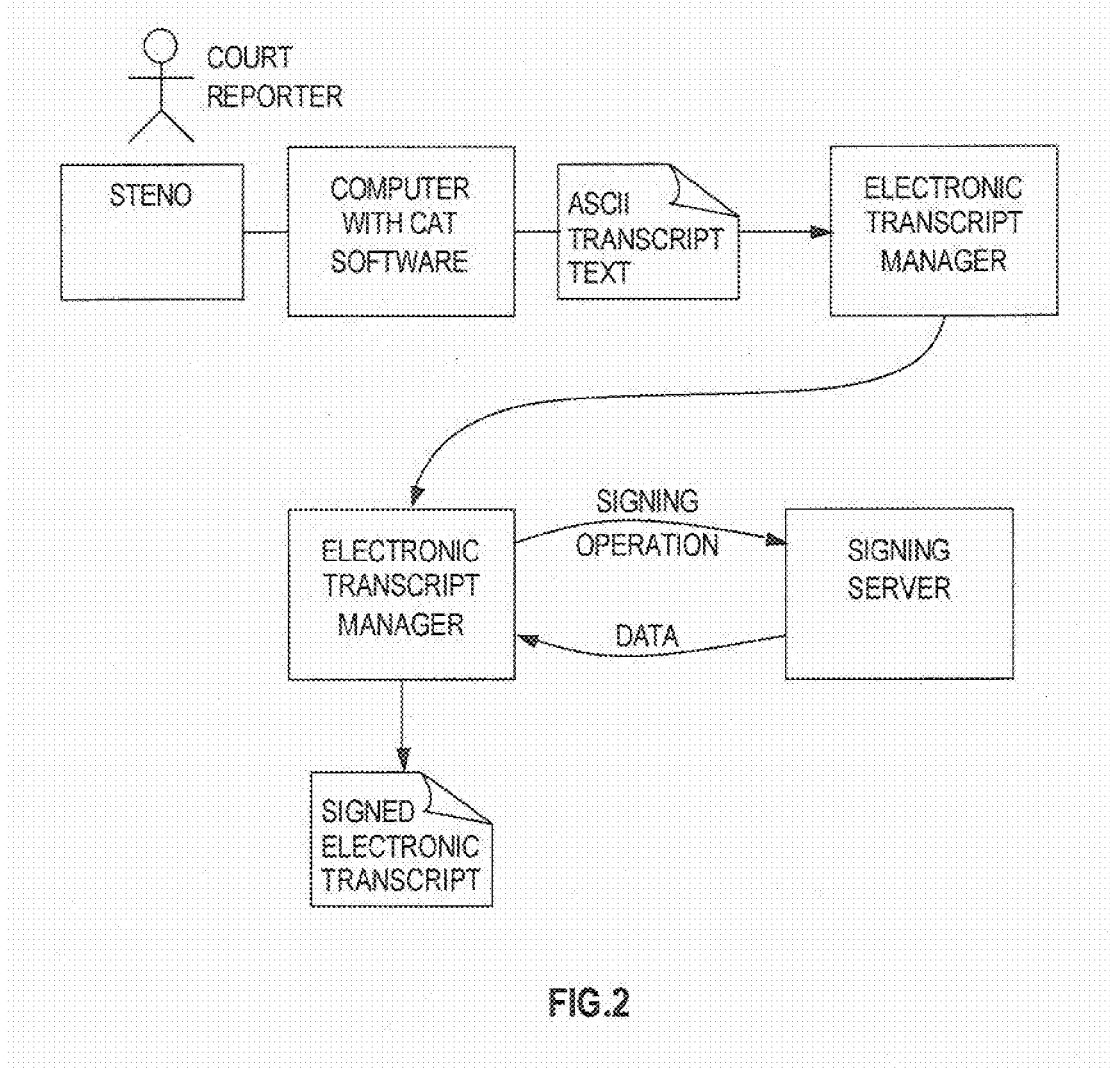
FIG. 2 illustrates a block diagram illustrating a software module communicating with a signing server, in accordance with one embodiment of the present invention.

FIG. 2 shows the manager module communicating with the signing server. The court reporter generates the "final" transcript text of the court proceeding, deposition or the like. The manager module then imports the transcript text and creates an electronic transcript, which is preferably a read-only, encrypted, virus- and password-protected, searchable, printable file. At the direction of the user (i.e., the signing entity which could be the court reporter or delegate), the electronic signing operation is commenced wherein the manager module performs the operations shown in FIG. 5 for electronically signing the electronic transcript. This process includes communication of the electronic signing information to the signing server as shown in FIG. 2. The completion of the signing operation results in an electronically signed electronic transcript file. The electronically signed electronic transcript file preferably contains transcript data, an executable viewer, metadata, and the electronic signature information. The electronic signature information preferably includes the signer's user ID, the signer's full name, the recipient's name (which is optional), the transcript title, and the unique transcript ID, but could include other information also.

In an alternative embodiment, the manager module generates a PTX file having the transcript data, the metadata, and the electronic signature data, but does not include an executable viewer file. In this manner, the PTX electronic transcript can be sent through any firewall that may be operating on the front-end of a recipient's computing system. In this example, the recipient could open the PTX electronic transcript file with a viewer module previously installed on the recipient's local computing station. As one of ordinary skill in the art would now recognize, it is possible to use other formats or standards, such as XML, to create the electronic transcript instead of generating a PTX file.

In accordance with embodiments of the present invention, the following processes will now be discussed; sign-up/account creation, creation of an electronic transcript, electronically signing an electronic transcript, verifying the signed electronic transcript, and other processes.

SignUp/Account Creation Process

In accordance with one embodiment of the present invention, an online sign-up function is provided, wherein the court reporter, which is used generically to refer to any signing entity, can sign up with a document signing service, preferably operating as a web site, which provides the electronic transcript and signing capabilities. Upon creating and activating an account with the document signing service hosting the signing service web site, the court reporter can begin creating electronic transcripts and electronically sign them. In one example, the document signing service provides at its web site an electronic form, displayed within the browser of the court reporter's computing system, permitting the signing entity, which in this example is the court reporter, to enter personal data, such as the court reporter's name, etc. At this time, the court reporter also may optionally create a billing account that will be accessible when his/her account is activated. The billing account would include the billing address and preferably operates using a credit card engine where no invoices are generated from the signing service web site to the court reporter once activated, and the court reporter can administer his/her personal and billing account.

The personal and billing account data is received and stored in the user/account database, and an account is created but, preferably, disabled until the court reporter submits an enrollment form notarized by a third party. On submission of the notarized enrollment form, preferably the account is activated, and a temporary and secure password is created, and sent to the court reporter for initial use. While the temporary password could be electronically transmitted, it is preferable to send the temporary password to the signing entity in a tamper proof envelope to ensure security. The signing entity activates the account by entering the temporary password. Optionally, and preferably, after entering the temporary password, the signing entity is compelled to change the temporary password to a new password chosen by the signing entity, at which time the signing entity's account is activated.

In managing his/her account, the court reporter can purchase a "bundle of signatures" (e.g., ten signatures for a fixed price), or pay on a per signature basis. Optionally, a billing account can be associated with one or more court reporters and the billing address associated therewith would typically include the billing address of the court reporting firm, or possibly a private law firm, a corporation, or other entity. In this way, a court reporter can charge the expenses associated with the electronic signature process directly to an authorizing third party, such as a court reporting firm. Preferably, if the court reporter purchases a "bundle of signature," when the court reporter electronically signs an electronic transcript, the number of "signatures" available to the court reporter is decremented. In an alternative embodiment, the court reports credit card (or the associated billing account) is on file and automatically billed for the transaction on a per signature basis.

Figure 3:
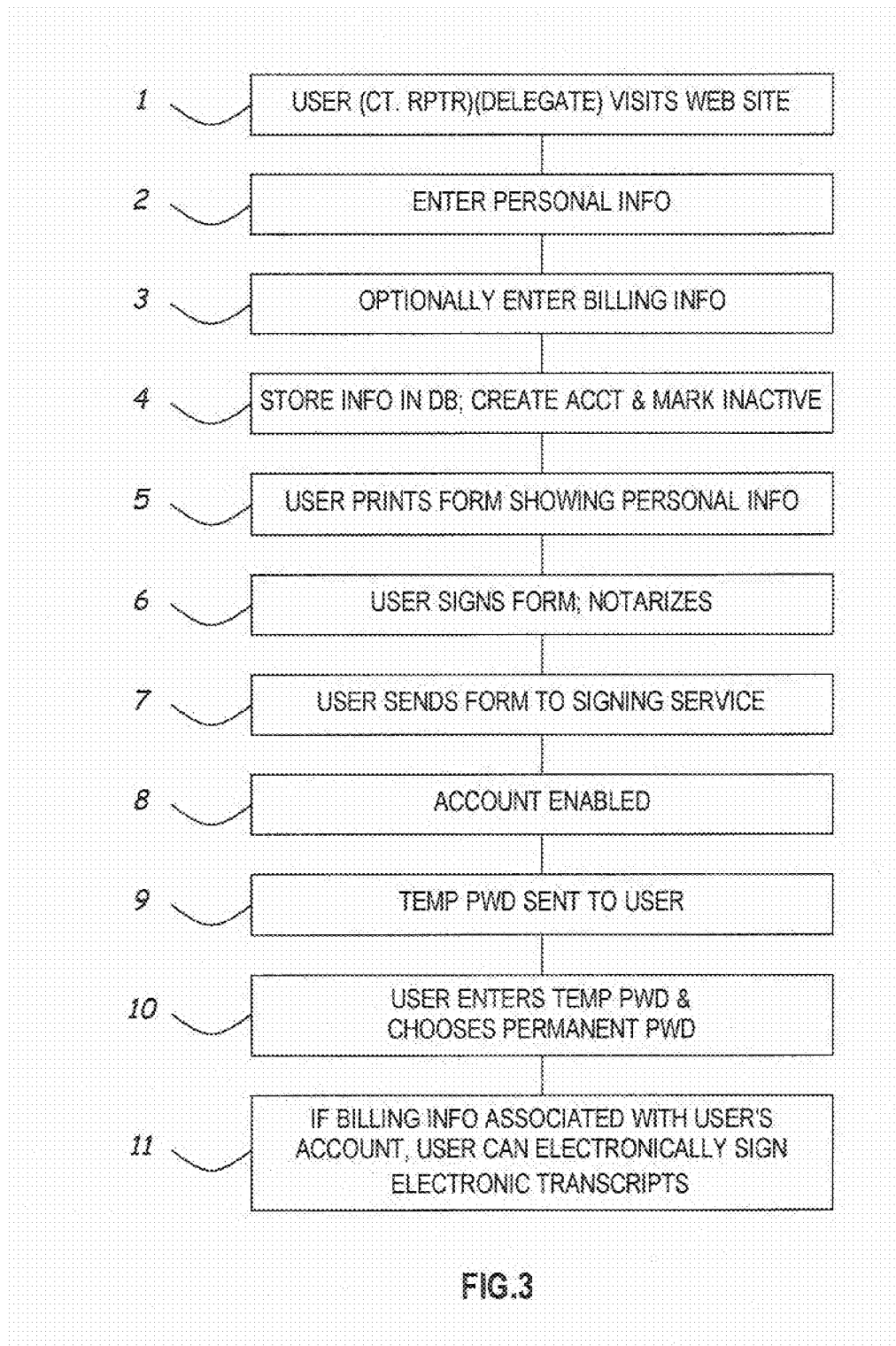
FIG. 3 illustrates one example of the logical operations to enroll with a signing service, in accordance with one embodiment of the present invention.

FIG. 3 shows the operations to enroll with the document signing service, in accordance with one embodiment of the present invention. At operation 1, the court reporter visits the web site of the document signing service that offers the electronic signature feature of the present invention. At operation 2, the court reporter enters personal information, such as the court reporter's name, address, certifications, username or NCRA number, into an entry form displayed within the browser of the court reporter's computing system. Optionally, in operation 3, the court reporter enters billing information. The sign-up process is preferably provided through a web site using https protocol, which is the secure version of http, thereby insuring that the sign-up information provided by a court reporter cannot be captured by unauthorized parties.

At operation 4, the personal information (and billing information, if present) is stored in a user/account database under the direction of the web site. And, at operation 4, an account is created corresponding to the particular court reporter, and preferably the account is marked inactive, as described above. At operation 5, the court reporter can print the form displayed in operation 2 having the court reporter's personal information therein, and preferably the username they have selected for using the service, to a local printer associated with the court reporter's computing system. At operation 6, the court reporter signs the printed form from operation 5, and preferably a third party notarizes the form. At operation 7, the court reporter sends the form, preferably notarized, to the company operating the document signing service web site, and in response at operation 8, the court reporter's account is enabled and is marked active. At operation 9, a temporary password is generated and sent, preferably in a sealed tamperproof envelope as discussed above, to the court reporter. At operation 10, the court reporter enters the temporary password to access the court reporter's account, and preferably the court reporter chooses a secret and permanent password replacing the temporary password of operation 9. At operation 11, if billing information is associated with the court reporter's account, the signing service offered by the signing service web site, is activated for that court reporter.

In one example of the present invention, a delegate relationship can be established (establishing a delegate relationship is explained further below). Where a delegate relationship is established, the delegate entity (such as an officer of a court reporting service) establishes an account of its own with a unique username, password and billing account with the user/account database and web site. Accordingly, when the delegate electronically signs an electronic transcript, the delegate's billing account is preferably charged for the transaction. In this manner, a freelance court reporter can electronically sign an electronic transcript by using the court reporter's individual account, or through the use of a delegate appointed by the freelance court reporter.

Figure 16:
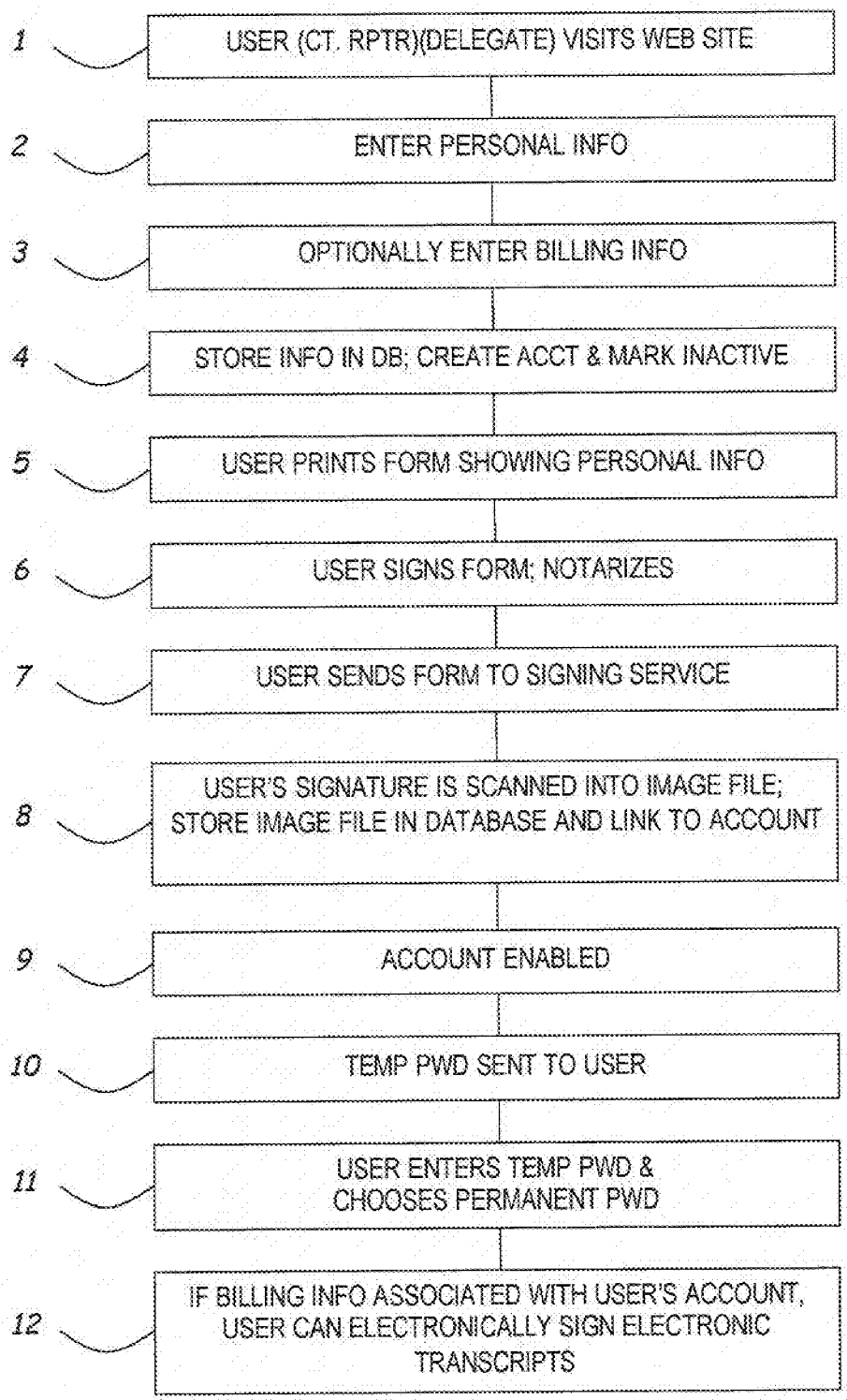
FIG. 16 illustrates one example of the logical operations to enroll with a signing service and scan a signature image for a court reporter, in accordance with one embodiment of the present invention.

In another embodiment, the document signing service may also provide an image of the court reporter's signature on an electronic transcript. When viewing a transcript in this embodiment, the image appears as the reporter's signature on the appropriate page of the transcript, thus giving the electronic transcript the appearance of a paper transcript that is signed by the reporter, and may also be notarized. In this embodiment, the court reporter sends a document having their signature thereon. The document, in this embodiment, is also notarized. The reporter's signature is scanned at the document signing service and may be provided on transcripts. FIG. 16 shows the operations to enroll with the document signing service, in accordance with this embodiment. At operation 1, the court reporter visits the web site of the document signing service that offers the electronic signature feature of the present invention. At operation 2, the court reporter enters personal information, such as the court reporter's name, address, certifications, username or NCRA number, into an entry form displayed within the browser of the court reporter's computing system. Optionally, in operation 3, the court reporter enters billing information. The sign-up process is preferably provided through a web site using https protocol, which is the secure version of http, thereby reducing the likelihood of unauthorized parties capturing the sign-up information provided by a court reporter.

At operation 4, the personal information (and billing information, if present) is stored in a user/account database under the direction of the web site. And, at operation 4, an account is created corresponding to the particular court reporter. In an embodiment, the account is marked inactive, as described above. At operation 5, the court reporter can print the form displayed in operation 2 having the court reporter's personal information therein, and may also include the selected username for using the service, to a local printer associated with the court reporter's computing system. At operation 6, the court reporter signs the printed form from operation 5, and a third party may notarize the form. At operation 7, the court reporter sends the form, with any included notary, to the company operating the document signing service web site. The signing service, upon receiving the signed form, scans the court reporter's signature into an image file, this creating an image of the reporter's signature, that is stored in the database and linked to the account, as indicated at operation 8. In one embodiment, the image file containing the image of the court reporter's signature is a JPEG file, although any of numerous other image file formats may be used to store the image of the court reporter's signature. At operation 9, the court reporter's account is enabled and is marked active. At operation 10, a temporary password is generated and sent, in a sealed tamperproof envelope as discussed above, to the court reporter. At operation 11, the court reporter enters the temporary password to access the court reporter's account, and the court reporter may choose a secret and permanent password replacing the temporary password of operation 10. At operation 12, if billing information is associated with the court reporter's account, the signing service offered by the signing service web site, is activated for that court reporter.

Similarly as described above with respect to FIG. 3, a delegate relationship can be established. Where a delegate relationship is established; the delegate entity (such as an officer of a court reporting service) establishes an account of its own with a unique username, password and billing account with the user/account database and web site. Accordingly, when the delegate electronically signs an electronic transcript, the delegate's billing account is preferably charged for the transaction. In this manner, a freelance court reporter can electronically sign an electronic transcript by using the court reporter's individual account, or through the use of a delegate appointed by the freelance court reporter.

Creating an Electronic Transcript

Figure 4:
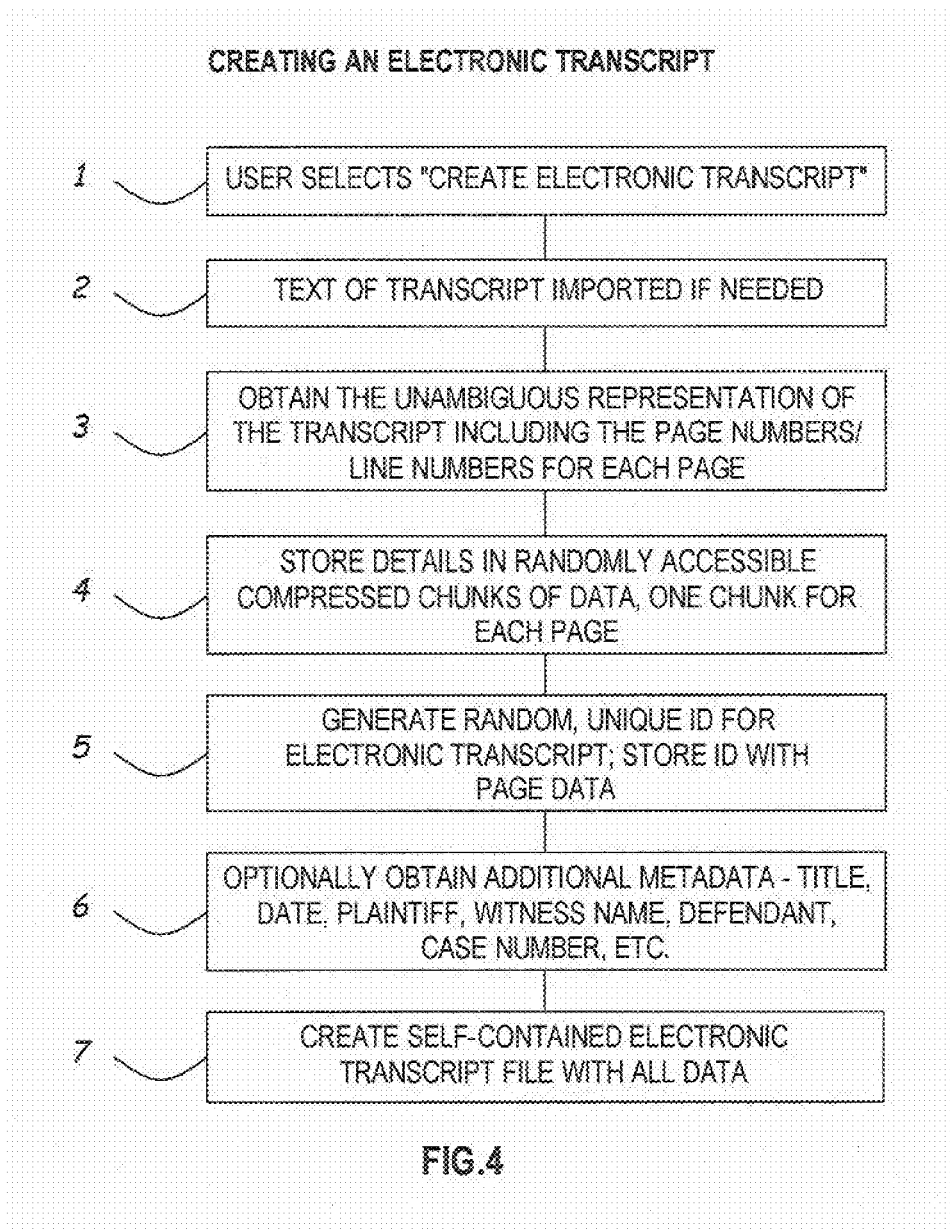
FIG. 4 illustrates the logical operations for creating an electronic transcript from a transcript file, in accordance with one embodiment of the present invention.

FIG. 4 illustrates the logical operations for creating an electronic transcript from a transcript text file. At operation 1, the user selects a "create electronic transcript" function within the manager module. At operation 2, the text file, which could be developed using ASCII, streaming text in case view, XML or another CAT system format, or other technology, is imported within the manager module and converted into a usable data format. Control is then passed to operation 3, wherein a representation of the transcript file is obtained. At operation 3, a representation of the transcript is obtained which includes numbers assigned to each page of the transcript as well as line numbers. At operation 4, the representational data obtained by operation 3 is stored, preferably in randomly accessible chunks of data, preferably one compressed chunk for each page of the transcript. At operation 5, a random and unique identification number for the transcript is created and stored along with the representational data for the entire transcript. The random unique identification number for the transcript is preferably a GUID (Globally Unique Identifier) that, for instance, can be generated on the Microsoft Windows® operating system, which is currently available from Microsoft Corporation, Redmond, Wash., using the CoCreateGUID function. At operation 6, which is optional, additional metadata relating to the electronic transcript file is obtained, and preferably includes the title (such as the caption), the date, the plaintiff, the witness name, the defendant, the case number, or the like. At operation 7, the electronic transcript file is created, preferably including the transcript text, the metadata including the information described, and the executable viewer file.

An electronic transcript preferably contains a number of elements. In one example, a "recipient field" is provided for and associated with the electronic transcript once it has been electronically signed. Preferably the recipient field is tied directly to the electronic signature. By tying the recipient field to the electronic signature, it can be, and preferably is, included in the combined hash, described further below. Including the recipient field in the combined hash inhibits the unauthorized re-routing of the electronically signed electronic transcript because the combined hashes will not match if the recipient field is changed. In so doing, the recipient field allows the court reporter to use the metadata to specify that the electronic transcript signature is valid only for the named recipient. In this example, the recipient field is preferably included in the metadata of the electronic transcript and is placed on each page of the signed electronic transcript so to appear whenever the transcript is either viewed or printed. The recipient field in effect makes the electronic transcript non-transferable by discouraging the unauthorized transfer of the electronic transcript. The receiving party is informed that the signature is valid only if it is the recipient so named.

Further, each printed page of the electronic transcript preferably indicates the name and/or the unique number assigned by the user/account database of the signer of the document (i.e., the identification of the signer and not the delegate), as well as the name of the recipient, discussed above.

Each electronic transcript preferably has a unique tracking number assigned thereto. The unique tracking number is electronically associated with the electronic transcript by being embedded in the metadata associated with the electronic transcript. The tracking number permits a user to later look up the electronic transcript. Preferably, the tracking number is displayed or printed on the bottom of each page of the electronic transcript. Typically, but not necessarily, the unique tracking number and the unique identification number for each electronic transcript can be the same.

Further, in one example, the signing server maintains an audit trail or record of all the electronically signed documents to facilitate tracking of the electronic transcript. Stored as metadata, this information preferably includes when the electronic transcript was signed, who signed the electronic transcript, the title, number of pages, unique tracking number, delegate (if any) and recipient of the electronic transcript. Because the tracking number is included in the signature hash, the number can be used in conjunction with the audit trail maintained by the signing server to provide separate verification. Furthermore, the signer has a full record of all the signatures that were created in his/her name, including the identity of documents that were signed directly by him/her or on his/her behalf by a delegate.

Figure 17:
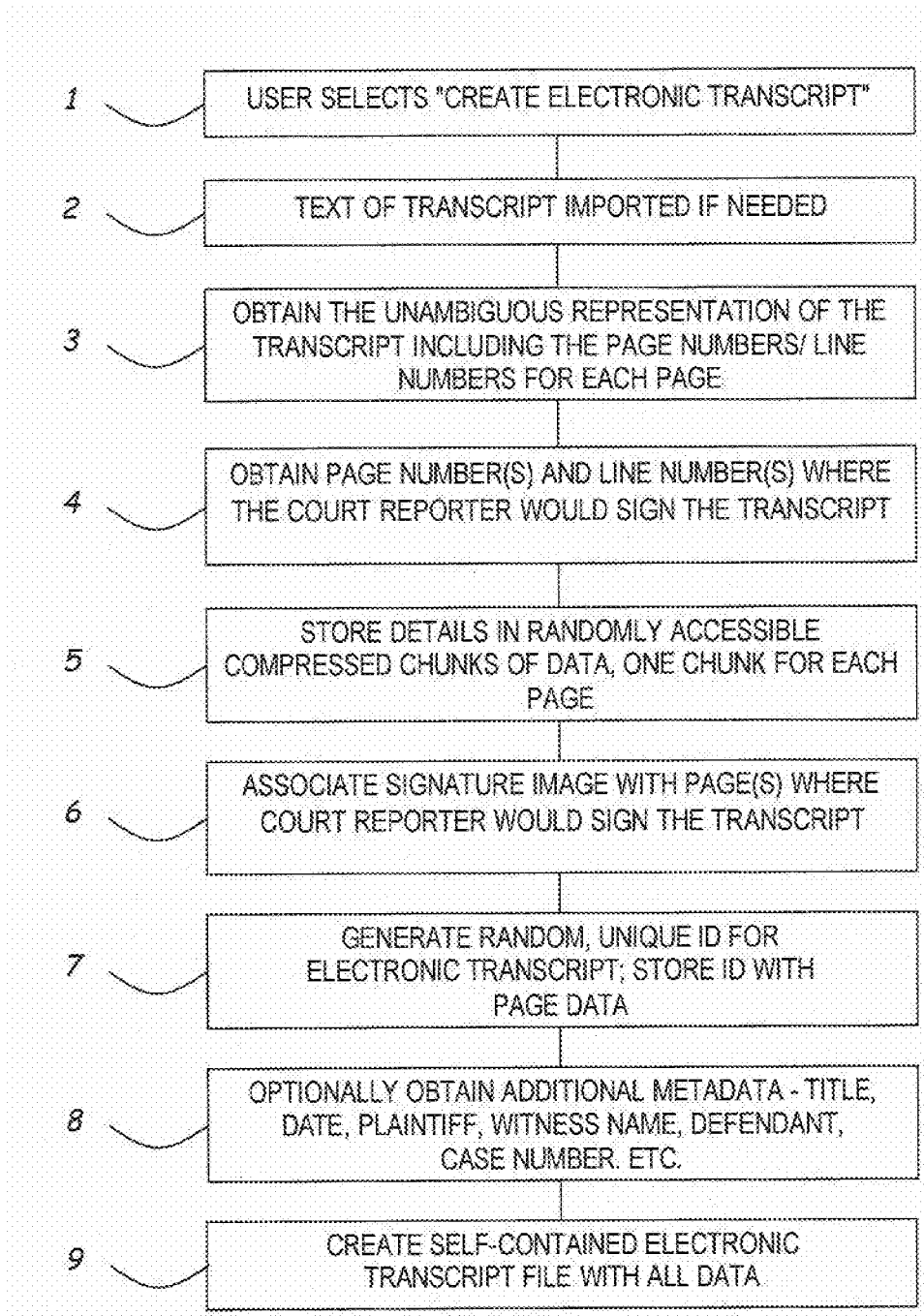
FIG. 17 illustrates the logical operations for creating an electronic transcript from a transcript file including an image of a court reporter's signature, in accordance with one embodiment of the present invention.

FIG. 17 illustrates the logical operations for creating an electronic transcript from a transcript text file where the court reporter has a signature image file at the signing service and desires to have a signature image appear in the electronic transcript. At operation 1, the user selects a "create electronic transcript" function within the manager module. At operation 2, the text file, which could be developed using ASCII, streaming text in case view, XML or another CAT system format, or other technology, is imported within the manager module and converted into a usable data format. Control is then passed to operation 3, wherein a representation of the transcript file is obtained. At operation 3, a representation of the transcript is obtained which includes numbers assigned to each page of the transcript as well as line numbers. The page number and line number where the court reporter would sign the transcript are obtained at operation 4. If the court reporter would sign the transcript at more than one location, each of the locations is obtained at operation 4. At operation 5, the representational data obtained by operations 3 and 4 are stored. In one embodiment, this representational data is stored in randomly accessible chunks of data, one compressed chunk for each page of the transcript. At operation 6, the signature image is associated with the page(s) where the court reporter would sign. The association may be accomplished in a number of ways, and in one embodiment, a pointer to the signature image file is incorporated into the transcript, with the pointer indicating that the signature image is located in a file that is included in the electronic transcript file. In another embodiment, the information regarding the location(s) of the signature image is stored in randomly accessible compressed chunks of data for the associated page on the transcript. As will be understood, numerous other options for associating a signature image with a location within a transcript are feasible. At operation 7, a random and unique identification number for the transcript is created and stored along with the representational data for the entire transcript. The random unique identification number for the transcript is preferably a GUID (Globally Unique Identifier) that, for instance, can be generated on the Microsoft Windows® operating system, which is currently available from Microsoft Corporation, Redmond, Wash., using the CoCreateGUID function. At operation 8, which is optional, additional metadata relating to the electronic transcript file is obtained, and preferably includes the title (such as the caption), the date, the plaintiff, the witness name, the defendant, the case number, or the like. At operation 9, the electronic transcript file is created, including the transcript text, the metadata including the information described, and the executable viewer file.

Similarly as described above with respect to FIG. 4, an electronic transcript may contain a number of elements. In one example, a "recipient field" is provided for and associated with the electronic transcript once it has been electronically signed. Preferably the recipient field is tied directly to the electronic signature and the electronic signature image file. By tying the recipient field to the electronic signature, it can be, included in the combined hash, described further below. Including the recipient field in the combined hash inhibits the unauthorized re-routing of the electronically signed electronic transcript because the combined hashes will not match if the recipient field is changed. In so doing, the recipient field allows the court reporter to use the metadata to specify that the electronic transcript signature, including the signature image, is valid only for the named recipient. In this example, the recipient field is preferably included in the metadata of the electronic transcript and is placed on each page of the signed electronic transcript so to appear whenever the transcript is either viewed or printed. The recipient field in effect makes the electronic transcript non-transferable by discouraging the unauthorized transfer of the electronic transcript. The receiving party is informed that the signature is valid only if it is the recipient so named.

Electronic Signing Process

Figure 5:
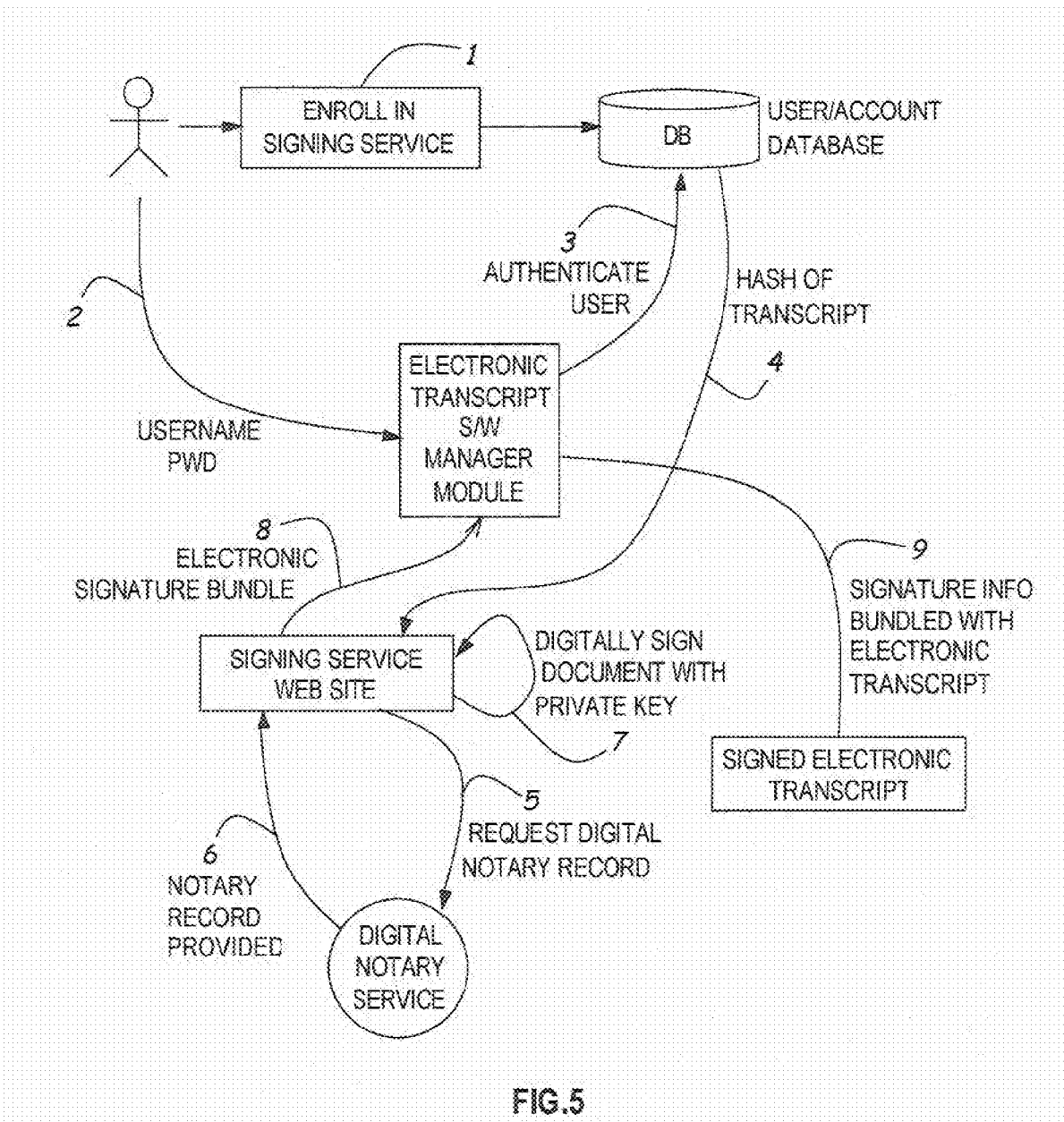
FIG. 5 illustrates the a representational diagram of the electronic signature process, in accordance with one embodiment of the present invention.
Figure 6:
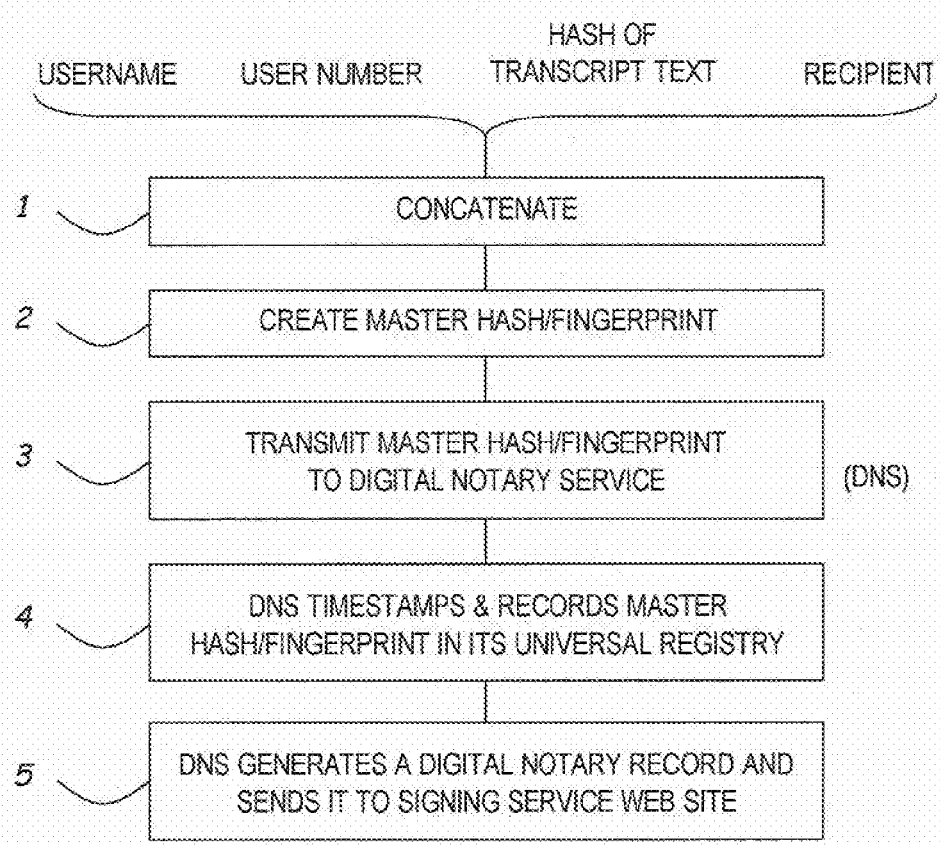
FIG. 6 illustrates various logical operations for electronically signing an electronic transcript, in accordance with one embodiment of the present invention.

In accordance with one embodiment of the present invention, a signing entity such as court reporter (or delegate thereof) can electronically sign a selected electronic transcript. FIG. 5 shows a representational diagram of the electronic signature process. FIG. 6 shows the logical operations performed by the present invention to effect an electronic signature on an electronic transcript.

Referring to FIG. 5, at operation 1, a signing entity (generically referred to as a court reporter) enrolls in the signing service and establishes an account with the signing service. Preferably, the signing service web site uses a secure protocol. Operation 1 can be performed, for example, as previously shown and described with reference to FIG. 3. As previously described, a user account includes a username and password, and other account information.

At operation 2, the court reporter provides his/her username and password to the manager module, and at operation 3, the manager module authenticates and verifies this user information against the information stored in the user/account database. At operation 3, the user information can be for a court reporter or for a delegate.

Operations 4-6 provide a digital notary record of the electronic transcript in accordance with an embodiment of the present invention. At operation 4, the text of the electronic document/transcript is passed through a "hash" operation, preferably a RIPEMD-160 hash of the text of the transcript excluding page and line numbers and headers/footers, with leading and trailing white spaces removed from each line and a single space added to each line for allowing re-wrap. Generally, the hash of a file is a mathematical computation that generates a unique representation of the contents of the file. If the contents of a file change in any way, the resulting hash of the file will also be 15 different.

Upon obtaining a hash of the text of the transcript, the signing server performs a number of operations in accordance with the present invention, as shown in FIG. 6. Referring to FIG. 6, the signing server concatenates the username, a unique user number associated with the user's account, the hash of the text of the transcript, the recipient's name (optional), and the unique transcript identifier, in one example. This concatenated data is passed through a "hash" operation also to create a "master hash" or "master fingerprint" of the electronic transcript and related data. Preferably, the master hash is created using Surety.com's fingerprinting API. In one example, the master hash provides a unique and verifiable representation of the electronic transcript and related data, and the master hash can be created without exposing the contents of the electronic transcript and related data. At operation 3 of FIG. 6, the master hash/master fingerprint of the electronic transcript and related data is sent to a digital notary service, such as Surety.com, wherein at operation 4, the digital notary service timestamps and records the master hash/master fingerprint (of operation 2) with the digital notary service's universal registry. At operation 5, the digital notary service generates a digital notary record and sends it to the web site.

In one example, the username of the signer, the signer's unique number assigned to them, the RIPEMD-160 hash of the text of the transcript, the global unique identifier of the transcript, and the recipient name, are all concatenated. As explained above, a master hash of the concatenated information is created, preferably using the Surety.com fingerprinting API. The master hash is then preferably transmitted to Surety.com, where it is time-stamped and returned to the signing server. These steps ensure that the signing event is widely witnessed as taking place at that moment in time, on that specific content, and therefore by that specific user. Referring back to FIG. 5, at operation 5, the signing server requests the digital notary record from the digital notary service, as described above. At operation 6, the digital notary service provides the digital notary record to the signing verification server web site. At operation 7, the information returned from the digital notary service (i.e., the notarization record from, for example, Surety.com) is digitally signed by the signing server, using its private key. In order to ensure the integrity of the signatures created by the signing server, a 128-bit secure certificate should be obtained from a vendor such as VeriSign. This ensures that the identity of the service cannot be mimicked by an impostor service.

At operation 8, the electronic signature bundle is transmitted to the manager module. At operation 9, the manager module bundles the electronic signature information with the electronic transcript to form an electronically signed electronic transcript, in one example. Alternatively, the web site creates the signed electronic transcript and sends it to the user, or archives it in a database for later access.

The electronic signature includes, in one example, the notarization record as digitally signed using the private key of the signing service, the certificate of the signing service, and additional information used to create the master hash, including the user ID and, preferably, the recipient field, as well as the full name (as looked up in the user/account database), the transcript title, and the unique tracking number. The notarization record (as digitally signed with the private key) represents the hash/fingerprint of the transcript text concatenated with the other data (FIG. 6, operation 1), as notarized by the digital notary service. The electronic transcript viewer module of the present invention provides a visual indicator in a status bar indicating if the electronic transcript has been signed or not. Upon a user activating the visual indicator, a window is created that shows details relating to the electronic signature, such as when the electronic transcript was signed, by who, along with the unique tracking number (which is preferably the same as the unique transcript identifier/tracking number discussed above) and the recipient, for example.

Furthermore, a user selectable button is provided in the viewer module for quickly displaying the certification page of the electronic transcripts.

Verification Process

Figure 7:
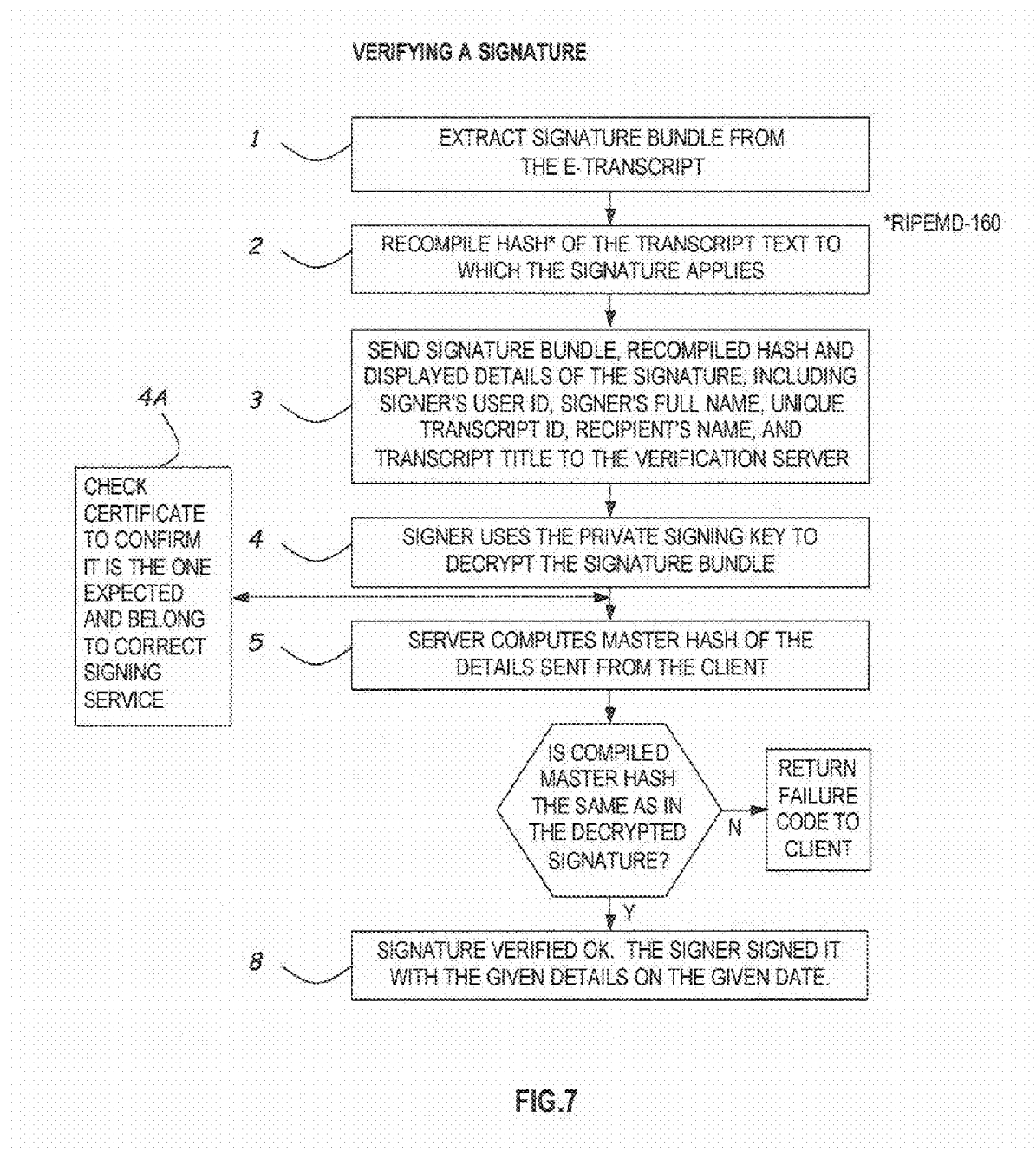
FIG. 7 illustrates the logical operations for verifying an electronic signature of ah electronic transcript, in accordance with one embodiment of the present invention.

In accordance with the present invention, a recipient of an electronic transcript can verify the authenticity and integrity of a signed electronic transcript. FIG. 7 shows the logical operations performed by the present invention to effect the ... verification of a signed electronic transcript.

At operation 1, the system extracts the signature bundle from the electronic document. At operation 2, the system recomputes a hash, using RIPEMD-160 as described below, for the electronic document. At operation 3, the process sends the extracted signature bundle, the recomputed hash, and displayed details of the extracted signature bundle, which include the signer's user ID, the signer's full name, the recipient's name, the unique transcript identifier, and the transcript title, to the verification server. The verification server uses the signing server's public key from within the certificate in the signature bundle to extract notary record from the signature bundle at operation 4, in so doing confirming that the signature was created by the owner of the certificate. At operation 4A, the certificate is checked to confirm it is the one expected and that it belongs to the correct signing service. At operation 5, the verification server computes a master hash from the display details of operation 3. At operation 6, a comparison is made between the master hash and the master hash contained in the notary record. If the comparison is not the same, a failure code is transmitted to the recipient at operation 7. Otherwise, if the comparison indicates the master hash and the hash contained in the notary record are the same, then the recipient receives a confirmation of the verification at operation 8. The verification operation indicates the signer signed the electronic document as indicated by the displayed details, at the point in time indicated in the notary record, and that the document has not changed.

The viewer module is provided with a user selectable "verification" or "validation" button that, when activated, initiates a process to verify the integrity of the electronic transcript. After completion of the verification process, a display window is generated that indicates the electronic transcript is proper, authentic (i.e. unchanged), and valid. If not, the display window indicates, preferably, that the electronic signature could not be validated (i.e., a failure code). In this manner, the verification process establishes whether the electronic transcript was unaltered from the moment that it was electronically signed by the court reporter or delegate. The verification process detects tampering with the contents of the time-stamp data, the name of the reporter, the contents of the electronic transcript, or alteration of any other data involved in the signing process. Note that preferably the verification process does not detect tampering with all the contents of the file but only the data considered necessary to verify the integrity of the transcript. In other words, metadata not essential to the integrity of the electronic transcript; such as format metadata or other extraneous information, can be altered without effecting the integrity of the electronic document.

As indicated above, part of the present invention involves computing RIPEMD-160 hash. While computing a hash is generally known in the art, to compute the hash in accordance with the present invention, the following operations are performed on each line on each page of the electronic document. The computation of the hash begins by stripping the leading and trailing white spaces on a line. A single space is then appended to the text of the line for allowing re-wrap, A hash for that line is them computed in a conventional manner. The computation of the RIPEMD-160 hash, which is a compilation of the line-by-line hash, is then used as the document hash. Notice that only actual transcript body text is used to calculate the hash. Preferably, other information, such as line numbers, page numbers, headers and footers are stripped during the conversion to the electronic document format and therefore take no part in the calculation of the RIPEMD-160 hash. While the page numbers, line numbers, etc. may be used to calculate the hash, eliminating page numbers, line numbers, etc. allows repagination and other format changes, while ensuring that the electronic signature remains valid. Even if the electronic document is repaginated, or presented or stored differently from when the hash was first calculated, the hashed content remains the same.

Other Features

Figure 8:
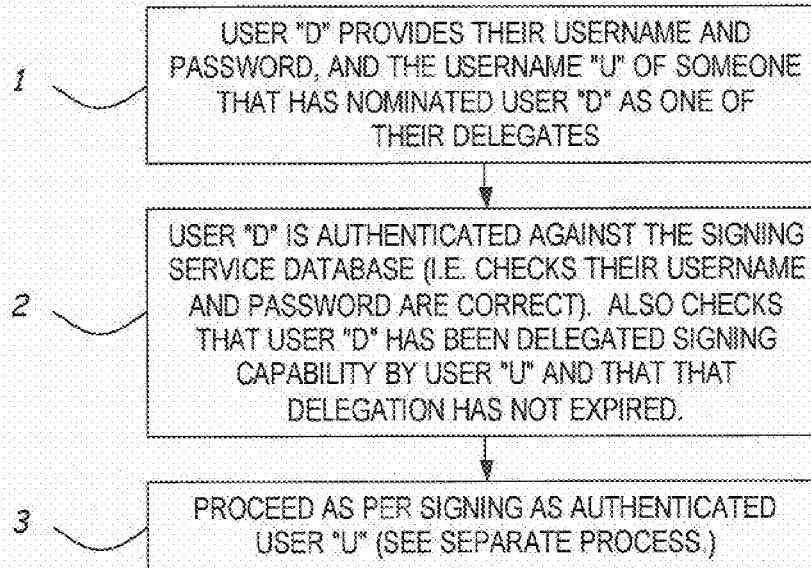
FIG. 8 illustrates the logical operations for delegate signing, in accordance with one embodiment of the present invention.

In accordance with one embodiment to the present invention, a delegate appointed by the court reporter can digitally sign a transcript on behalf of the court reporter. Preferably, the authorization by the court reporter of the delegate to electronically sign a transcript has an expiration time period, and/or a maximum number of electronic transcripts the delegate can sign on behalf of the court reporter. Referring to FIG. 8, the process for permitting a delegate to electronically sign on behalf of a court reporter is illustrated. At operation 1, the delegate provides its user name and password into the signing server offering the signing service. Further, the delegate provides the user name of the court reporter authorizing the delegate to sign on the court reporter's behalf. At operation 2, the delegate is authenticated against the user/account database. In one example, the database confirms the user name and password are proper, and that the delegate has in fact been authorized by the court reporter to sign on his/her behalf. Preferably, the signing service determines whether the delegation has expired (i.e., the time window of authorization has ended, or the delegate has exceeded the maximum number of electronic signing transactions authorized by the court reporter). At this point, the delegate can electronically sign the electronic transcript in the same or similar manner to the process employed with respect to a court reporter's electronic signature.

Figure 9:
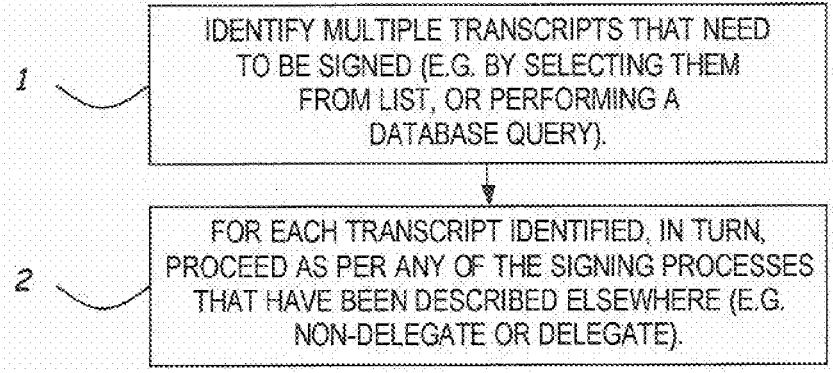
FIG. 9 illustrates the logical operations for batch signing, in accordance with one embodiment of the present invention.

Further, in one embodiment of the invention, a court reporter can electronically sign multiple electronic transcripts at once through a batch signing process. FIG. 9 shows the logical operations for performing a batch signing process. These operations are preferably performed by the manager module, or automatically upon uploading of the electronic transcripts to a separate storage web site (not shown in the figures). At operation 1, multiple transcripts needing electronic signatures are identified. In one example, the user selects two or more electronic transcripts from a list, or initiates a database query which produces a list of electronic transcripts. The user (court reporter or delegate) then selects the particular electronic transcripts needed. At operation 2, for each transcript identified, the electronic signing process is performed for that particular electronic transcript. Preferably, operation 2 is repeated until all transcripts identified in operation 1 as needing to be electronically signed, have the requested electronic signature associated therewith.

Figure 10:
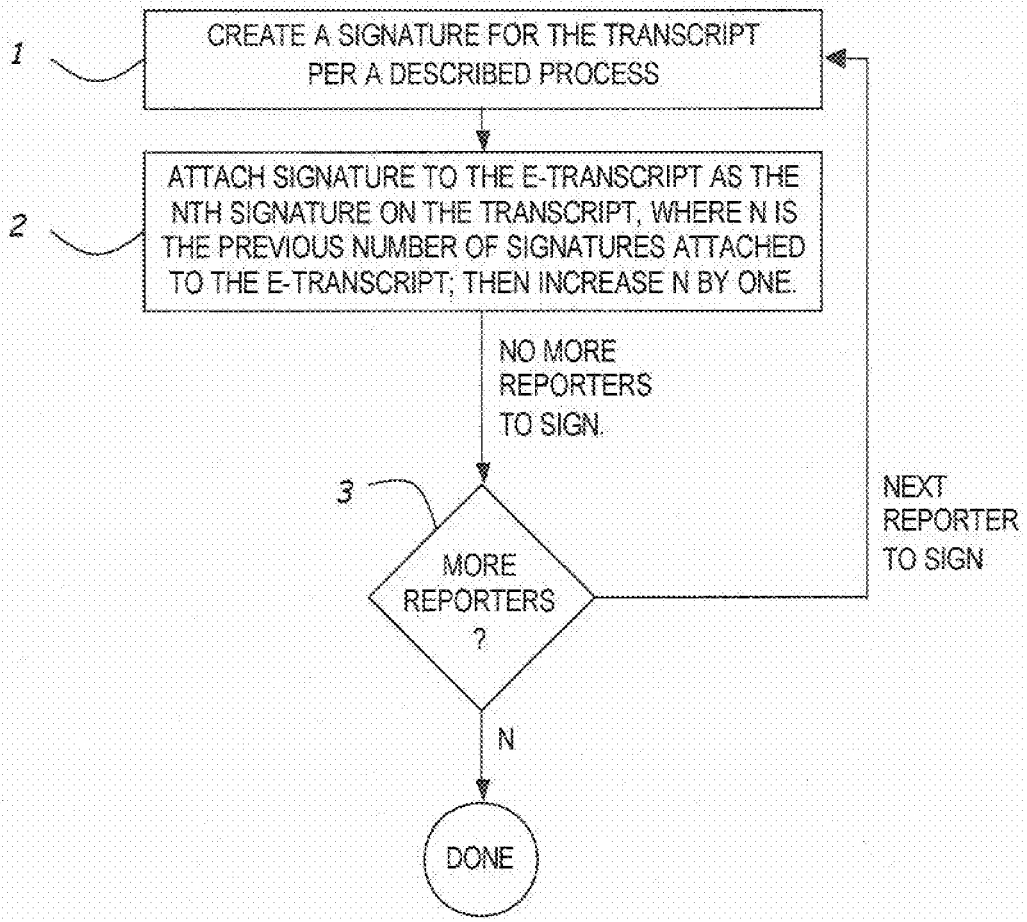
FIG. 10 illustrates the logical operations for bundling multiple signatures on a single electronic transcript, in accordance with one embodiment of the present invention.

Further, in accordance with the present invention, a single electronic transcript can be signed by one or more different court reporters. FIG. 10 shows the logical operations for bundling multiple signatures on a single electronic transcript. These operations are preferably performed by the manager module, and permit the acceptance of multiple signatures from different court reporters in a single electronic transcript. At operation 1, an electronic signature for the electronic transcript is created as previously described. At operation 2, the electronic signature created by operation 1 is attached to the electronic transcript and assigned an index N on the transcript. Preferably, N represents the previous number of signatures attached to the transcript. For instance, initially N will be zero when the first signature created at operation 1 is attached to the electronic transcript. Operation 2 then increments N, and passes control to decision operation 3. Decision operation 3 determines if there are more court reporters which are to electronically sign the electronic transcript. If not, then the process is concluded. Otherwise, control is returned to operation 1, wherein operations 1-2 are performed iteratively until all of the reporters who are to electronically sign the transcript have done so.

In accordance with another embodiment of the present invention, a single electronic transcript is divided into subranges, each of which can be electronically signed by different court reporters. Preferably, a first court reporter nominates a starting page and an ending page for the portion of the electronic transcript the first court reporter wishes to sign. The hash, preferably the RIPEMD-160 hash, is computed on the subrange specified by the first court reporter. If the verification operation is subsequently performed, only this particular subportion is checked with respect to the first court reporter. The recipient's user interface will indicate that only the subrange was signed by the first court reporter. The process then continues for a second reporter who nominates a starting and ending page of the transcript the second court reporter wishes to sign.

Figure 11:
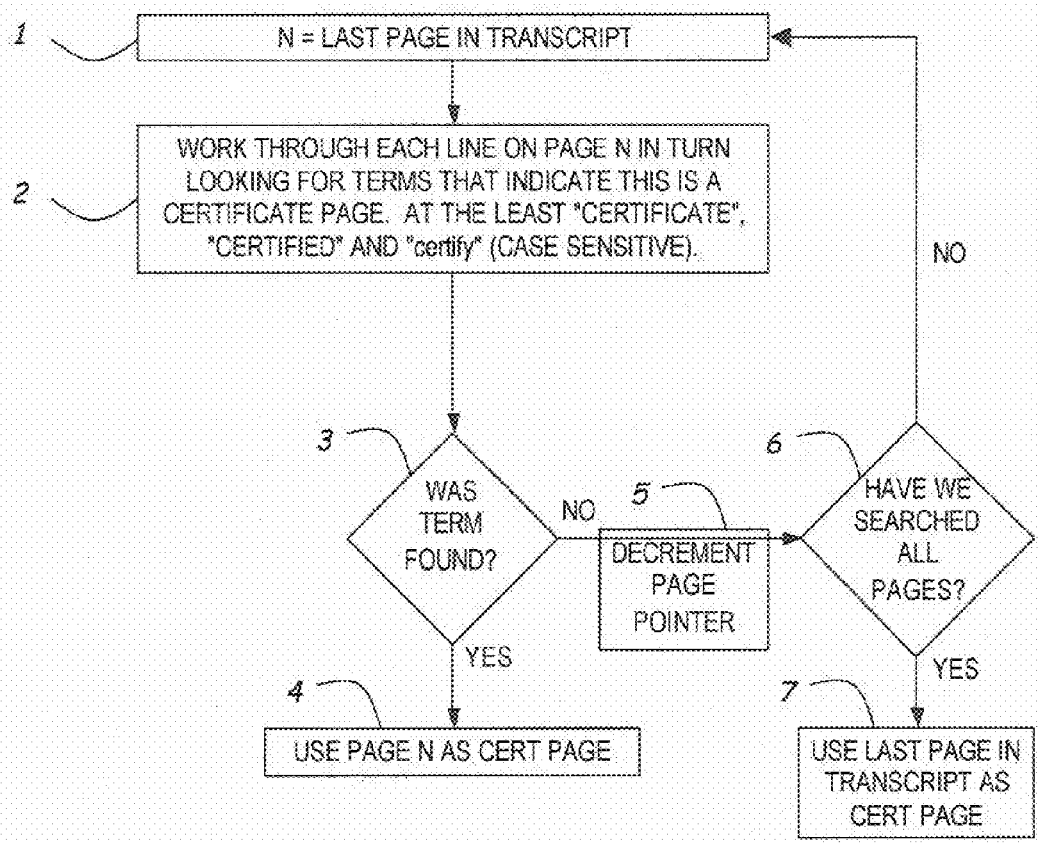
FIG. 11 illustrates the logical operations for automatically determining the certificate page of an electronic transcript, in accordance with one embodiment of the present invention.

Furthermore, in accordance with one embodiment of the present invention, a user selectable certificate/certification page is provided wherein the court reporter can tailor the contents of the certificate page, as well as the language of the signature and certification, to conform to local court rules. Further, in accordance with one embodiment of the present invention, the court reporter can specify where the electronic signature will appear in the electronic transcript. Preferably, the manager module determines where the certification page exists and suggests to the court reporter that the electronic signature be placed thereon, as a default location. FIG. 11 illustrates the process of automatically determining the certificate page within the electronic transcript. Preferably, these operations are performed within the manager module. At operation 1, the manager module determines the total number of pages in the transcripts, and sets a pointer to the last page in the transcript. At operation 2, each line of the electronic transcript at the location of the pointer (i.e., the last page during the first iteration) is scanned for terms indicating that the present page is a certificate page. For example, operation 2 scans for the words, "CERTIFICATE," "CERTIFIED," "certify," or the like. Preferably, the scan operation is case sensitive. Decision operation 3 determines whether the desired search terms of operation 2 were found on the present page. If so, then operation 4 establishes the present page as a certificate page. If the search terms of operation 2 were not found, then control is passed to operation 5 which preferably decrements the page pointer to the next lowest-number page in the electronic transcript Decision operation 6 tests whether all pages have been searched. This would occur, for instance, when the page pointer was equal to zero. If all pages have been searched for the search term, then control is passed to operation 7 wherein the last page of the electronic transcript is used as the certificate page. If all pages of the electronic transcript have not been searched as determined by operation 6, then control is returned to operation 2 to perform another iteration of the process.

Further, while embodiments of the invention have been described with reference to a transcript, it will be understood that the present invention can be used to electronically sign an electronic document in general, and verify the same.

The invention can be embodied in a computer program product. It will be understood that the computer program product of the present invention preferably is created in a computer usable medium, having computer readable code embodied therein. The computer usable medium preferably contains a number of computer readable program code devices configured to cause a computer to affect the various functions required to carry out the invention, as herein described.

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

The foregoing embodiments and examples are to be considered illustrative, rather than restrictive of the invention, and those modifications, which come within the meaning and range of equivalence of the claims, are to be included therein. While the invention has been particularly shown and described with reference to a preferred embodiment thereof, it will be understood by those skilled in the art that various other changes in the form and details may be made without departing from the spirit and scope of the invention.

What is claimed is:

1. A method for electronically signing an electronic transcript, comprising:
   obtaining an electronic transcript representative of transcript data;
   generating a first representation by performing a first hash operation on the electronic transcript;
   appending data that is representative of a user to the first representation to form an appended first representation;
   generating a second representation by performing a second hash operation on the appended first representation;
   communicating the second representation to a digital notary service;
   receiving from the digital notary service a digital notary record based on the communicated second representation; and
   forming an electronically signed electronic transcript by bundling the digital notary record, the electronic transcript, and the data that is representative of the user.

2. The method of claim 1, further comprising
   fetching an electronic image of a signature of the user; and
   importing the electronic image of the signature of the user to the electronic transcript.

3. The method of claim 1, wherein the first and the second hash operation comprises a RIPEMD-160 hash operation.

4. The method of claim 1, wherein the digital notary record comprises a time stamp of the second representation.

5. The method of claim 1, wherein the data that is representative of the user includes a user name that uniquely identifies the user.

6. The method of claim 5, wherein the data that is representative of the user also includes data uniquely identifying the electronic transcript.

7. The method of claim 2, further comprising:
obtaining the electronic image of the signature of the user and storing the electronic image of the signature of the user,
wherein fetching the electronic image of the signature of the user comprises fetching the electronic image from storage.

8. The method of claim 7, wherein importing the electronic image of the signature of the user to the electronic transcript comprises:
identifying a signature location within one of a plurality of pages of the electronic transcript; and
merging the electronic image of the signature to the signature location.

9. A method for electronically signing an electronic transcript, comprising:
receiving a signature document having a signature thereon from a user;
scanning the signature into a signature image file, wherein the signature image file comprises an image of the signature;
receiving an electronic transcript comprising a plurality of pages, at least one of the pages to have a signature therein certifying the accuracy of the transcript;
receiving signature location information that indicates a location within the electronic transcript where the image of the signature is to appear when the electronic transcript is displayed on a viewer;
incorporating the electronic transcript, the signature image file and the signature location information into an electronic transcript file;
performing a first hash operation on the electronic transcript file to generate a representation of the contents of the electronic transcript file;
concatenating data that identifies a user to the representation of the contents of the electronic transcript file; and
performing a second hash operation on the data and the representation, the second hash operation generating a representation of the contents of the electronic transcript file and the data;
providing for the recording and time stamping by a digital notary service of the representation of the contents of the electronic transcript file and the data file;
obtaining a notary record from the digital notary service of the time stamping;
digitally signing the notary record; and
forming an electronically signed electronic transcript by bundling the digitally signed notary record with the electronic transcript file.

10. The method of claim 9, wherein the first and second hash operations are a RIPEMD-160 hash operation.

11. The method of claim 9, wherein the data includes a user name uniquely identifying the user.

12. The method of claim 9, wherein the data includes a unique identifier that uniquely identifies the transcript.

13. The method of claim 9, further comprising displaying the electronic transcript with the image of the signature.

14. A non-transitory computer readable medium storing instructions that when executed on a computer cause the computer to:
receive an electronic transcript comprising a plurality of pages, at least one of the pages to have a signature therein;
receive signature location information that indicates a location within the electronic transcript where the signature is to appear when the electronic transcript is displayed on a viewer;
incorporate the electronic transcript, a signature image file and signature location information into an electronic transcript file, wherein the signature image file comprises an image of the signature;
perform a first hash operation on the electronic transcript file to generate a representation of the contents of the electronic transcript file;
concatenate data that identifies a user to the representation of the contents of the electronic transcript file; and
perform a second hash operation on the data concatenated to the representation, the second hash operation generating a representation of the contents of the electronic transcript file and the data;
provide for the recording and time stamping by a digital notary service of the representation of the contents of the electronic transcript file and the data;
obtain a notary record from the digital notary service of the time stamping;
digitally sign the notary record; and
form an electronically signed electronic transcript by bundling the digitally signed notary record with the electronic transcript file.

* * * * *